United States Patent [19]

Dechavanne

[11] 4,401,307

[45] Aug. 30, 1983

[54] SEAL, SCRAPER, AND GUIDE FOR PISTON ROD OF SINGLE-ACTION CYLINDER

[76] Inventor: Jacques Dechavanne, 9, Chemin du Gua, Sassenage (Isere), France

[21] Appl. No.: 301,033

[22] Filed: Sep. 10, 1981

[51] Int. Cl.³ .............................................. F16J 15/32
[52] U.S. Cl. .................................... 277/50; 277/152; 277/165; 277/186
[58] Field of Search .................................. 277/47–50, 277/152, 153, 165, 166, 181, 185, 186, 189

[56] References Cited

U.S. PATENT DOCUMENTS

| | | | |
|---|---|---|---|
| 2,981,573 | 4/1961 | Reuter | 277/153 X |
| 4,026,563 | 5/1977 | Bainard | 277/181 X |
| 4,261,583 | 4/1981 | de Vries et al. | 277/181 X |
| 4,280,741 | 7/1981 | Stoll | 277/152 X |

FOREIGN PATENT DOCUMENTS 1050214 2/1959 Fed. Rep. of Germany ...... 277/152

Primary Examiner—Robert S. Ward, Jr.
Attorney, Agent, or Firm—Karl F. Ross; Herbert Dubno

[57] ABSTRACT

A seal and guide assembly has an outer normally fixed element having a cylindrical throughgoing passage centered on an axis, extending between an axially inside high-pressure side and an axially outside low-pressure side, and having an inner element surface formed with a shoulder facing the inside high-pressure side. A cylindrical normally axially slidable element extends axially between the sides through the passage and has an outer element surface spaced radially inwardly of the inner element surface. A tubular body in the passage surrounds the slidable element and has an end face flatly abutting the shoulder, an axially inside end lip exposed at the inside high-pressure side, having a web connecting it to the body, and an end lying in the absence of the slidable element radially inward of the cylindrical inner surface and normally bearing radially inward on this slidable element, axially interengaging locking formations on the fixed element and on the body for blocking the body in the fixed element against axially inward displacement, and an axially outside end scraper lip exposed at the outside low-pressure side, lying in the absence of the slidable element radially inward of the cylindrical inner surface, and normally bearing radially inward on the slidable element. An elastomeric ring at the inner high-pressure side and engages between the inner lip and the wall and normally elastomerically urges the inside lip inward against the slidable element.

10 Claims, 6 Drawing Figures

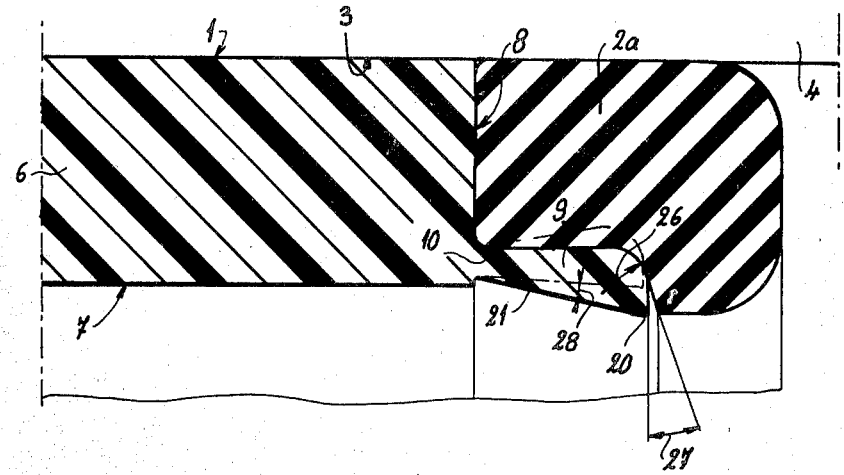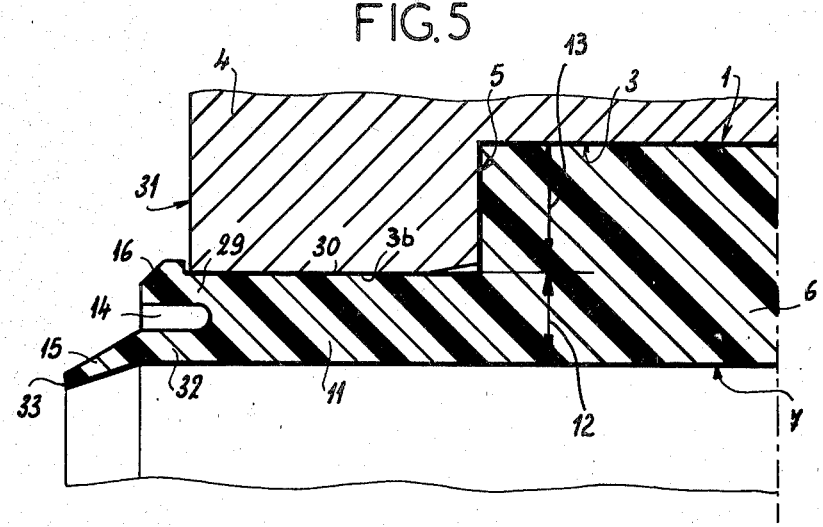

SEAL, SCRAPER, AND GUIDE FOR PISTON ROD OF SINGLE-ACTION CYLINDER

FIELD OF THE INVENTION

The present invention relates to a seal, scraper, and guide assembly. More particularly this invention concerns such an assembly for a piston rod of a single-action ram or cylinder where it extends out of its cylinder.

BACKGROUND OF THE INVENTION

The end wall of a hydraulic cylinder is normally formed with a throughgoing cylindrical hole or passage whose inner surface is spaced radially outward from the outer surface of the piston rod that passes through it. This inner wall is normally formed with various inwardly open grooves that receive various elements. These elements include a relatively hard guide that snugly engages the outer surface of the piston rod to center it in the passage, an outside scraper which prevents anything that has become deposited on the piston rod while it is outside the cylinder from being drawn back into the cylinder, and of course on the inside high-pressure side a gland or seal that prohibits leakage from the cylinder. This seal is normally a so-called cup that is of U-section open toward the inside high-pressure side.

The main problem with such an assembly is obviously that it is complex. If any of its elements fails, it is necessary to disassemble the entire structure. A careful worker also normally also replaces all of the other parts while the assembly is in pieces, as the cost of the parts is relatively small compared to the cost of the labor installing them.

OBJECTS OF THE INVENTION

It is therefore an object of the present invention to provide an improved guide, scraper, and seal assembly for a piston rod.

Another object is to provide such an assembly which is substantially easier to service than the prior-art such arrangements.

SUMMARY OF THE INVENTION

These objects are attained according to the instant invention in a combined assembly having an outer normally fixed element having a cylindrical throughgoing passage centered on an axis, extending between an axially inside high-pressure side and an axially outside low-pressure side, and having a cylindrical inner element surface formed with a shoulder facing the inside high-pressure side and a cylindrical normally axially slidable element extending axially between the sides through the passage and having an outer element surface spaced radially inwardly of the inner element surface.

According to this invention the assembly has as its main part a tubular body centered in the passage on the axis and having in turn an outer body surface engaging radially outward against the inner element surface, a cylindrical inner body surface engaging radially inwardly against the outer element surface so that the slidable element is guided in this body, an end face engaging axially away from the high-pressure side against the shoulder, an axially inside end lip exposed at the inside high-pressure side, having a web connecting it to the body and an end lying in the absence of the slidable element radially inward of the cylindrical inner surface, and normally bearing radially inward on this slidable element, means including axially interengaging locking formations on the fixed element and on the body for blocking the body in the fixed element against axially inward displacement, and an axially outside end scraper lip exposed at the outside low-pressure side, lying in the absence of the slidable element radially inward of the cylindrical inner surface, and normally bearing radially inward on the slidable element. In addition the assembly of this invention has an elastomeric ring at the inner high-pressure side and engaged between the inner lip and the wall and normally elastomerically urging the inside lip inward against the slidable element.

Thus the seal and guide structure of the assembly according to the instant invention can be mounted with extreme ease in the passage. With one-piece construction it is possible to replace all the guide, scraper, and seal structure with a single subassembly that is simply fitted into the passage through the cylinder wall. All of the wear-prone structure can easily be replaced in a single relatively simple operation. In fact the manufacturer of a cylinder need not go to great pains to provide and mount the various seal, scraper, and guides, but can merely insert in the passage through the cylinder wall the appropriate unit supplied by a seal manufacturer.

According to another feature of this invention the end lip is radially thinner at the web than at its end. In addition this end lip engages the piston generally along a line in line contact and the end lip is thickest at this line. The end lip has a radially inwardly concave inner lip surface between this line and the web. Such an end lip can easily compensate out any deformation of the ring caused by material fatigue.

In accordance with yet another feature of this invention the end lip has a radially outwardly convex outer lip surface engaging the ring. In addition the ring has an inner ring surface complementary to the outer lip surface. Furthermore the inner ring surface has an axially inside portion spaced from the outer lip surface in the absence of the slidable element.

The body, according to another feature of the invention, has an extension extending toward the low-pressure side from the end face and of smaller radial thickness than the body between the end face and the end lip. This extension is formed with an axially outwardly open groove splitting it into this scraper lip and into another lip constituting one of the formations.

It is also possible according to this invention for the body to be formed as an inside part forming portions of the inner and outer body surfaces, having the end face, and carrying the end lip, and an outside part spaced axially in the passage from the inside part, forming portions of the inner and outer body surfaces, having the scraper lip, and formed with one of the formations. The inside and outside parts further comprise respective means for blocking them against displacement toward the respective high-pressure and low-pressure sides. More particularly this means for blocking the inside and outside parts against displacement toward the high-pressure and low-pressure sides includes respective radially outwardly extending but radially inwardly deflectable formations closely axially juxtaposed with each other. The fixed element is formed with radially inwardly open grooves receiving the outwardly extending formations and also closely axially juxtaposed with each other.

DESCRIPTION OF THE DRAWING

The above and other features and advantages will become more readily apparent from the following description, reference being made to the accompanying drawing in which:

FIG. 4 is a view similar to FIG. 2 but showing another assembly according to this invention;

FIG. 5 is a large-scale view of another detail of FIG. 1; and

SPECIFIC DESCRIPTION

Figure 1:
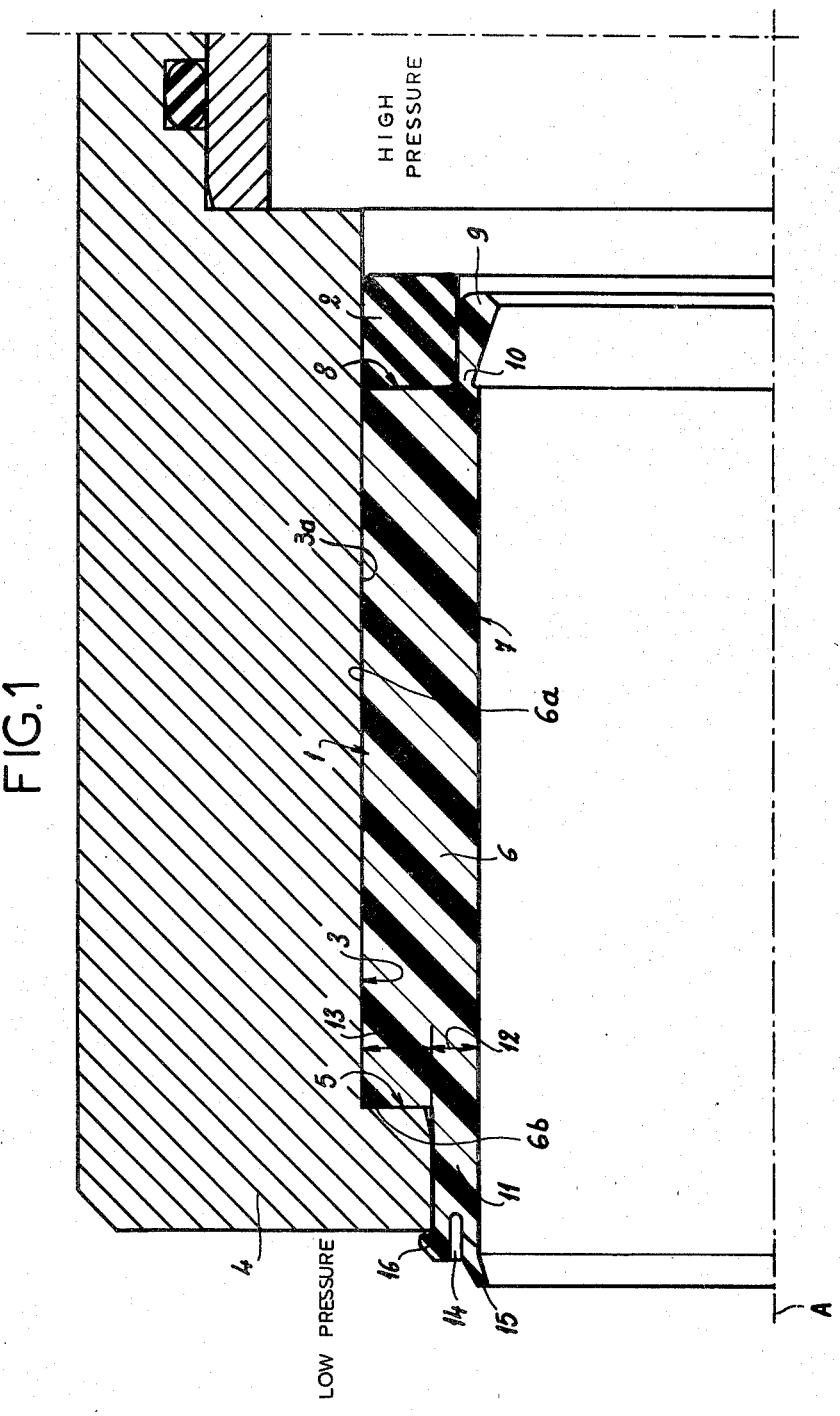
FIG. 1 is an axial section through a portion of a guide and seal assembly according to this invention.

As seen in FIG. 1 a seal and guide assembly 1 for a single-acting cylinder has a main tubular body 6 and an elastomeric ring 2 received in a generally cylindrical bore or passage 3 of an outer fixed element 4 centered on an axis A and normally forming part of a pressurizable cylinder having as seen in the drawing high pressure on the right and low or ambient pressure on the left.

The body 6 has an outer surface 6a bearing radially outwardly against the inner surface 3a of the passage 3, an inner surface 7 bearing radially inwardly against the outer surface 23a (see FIG. 3) of a cylindrical slidable piston rod 23 passing through the bore 3, and an end face 6b bearing axially outward against a perpendicular shoulder 5 formed in the bore 3 and facing the high-pressure or right side. The body 6 is normally formed of a flexible but hard material.

The body 6 further has an inside face 8 from which an end lip 9 extends axially inwardly, connected to the body 6 by a relatively thin hinge or web 10. At its opposite end the body has a cylindrical extension 11 whose inner surface coincides with the surface 7 and which is of a thickness 12 which is equal to between one-third and two-thirds of the thickness 13 of the portion of the body 6 in axial line with the end face 6b. The far end of this extension 11 is formed with an axially outwardly open groove 14 subdividing it into an inwardly extending scraper lip 15 and an outwardly hooked holding formation or lip 16, both of which can deflect toward the groove 14.

Figure 2:
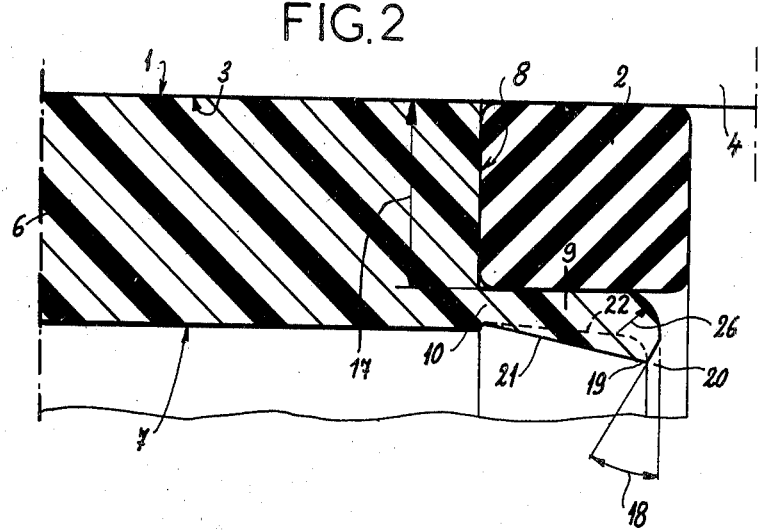
FIG. 2 is a large-scale view of a detail of FIG. 1.

As better shown in FIG. 2 the end lip 9 forms a recess for the ring 2 having a depth 17 equal to substantially more than the dimension 13. This end lip 9 has a flattened end surface 20 forming an angle 18 of about 30° to a perpendicular to the axis A and defining with a flat inside face 21 a sharp edge 19, with the two flat faces or surfaces 20 and 20 perpendicular to each other. It is also possible for the surface 21 to be replaced by an inwardly concave surface 22 so as to make even finer line contact 19 with the piston rod 23, which may rotate about the axis A as well as reciprocate therealong.

Figure 3:
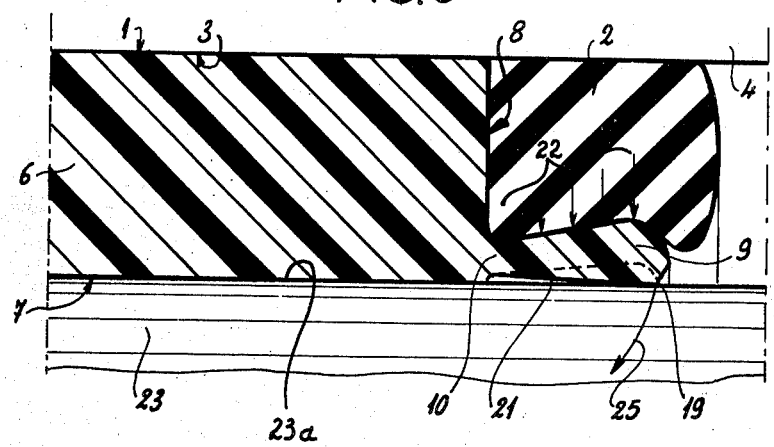
FIG. 3 is a view similar to FIG. 2 but showing the piston rod or slidable element in place.

FIG. 3 shows the system in use, with the various forces represented by arrows. When compressed the lip 9 is deformed to create inwardly effective forces 24 which urge the line or edge 19 against the rod 23 with a large force as indicated at 25. This creates a very tight seal.

This large force 25 caused by the tensions in the web 10 compensates for the so-called memory loss of the ring 2. Effectively the ring 2, which is made of supple elastomeric material, does deform somewhat plastically no matter what it is made of. This plastic deformation is compensated for by the reaction of the tensions in the web or hinge 10.

In order to prevent the rear surface of the relatively hard lip 9 from digging into the soft ring 2 it is possible as shown in FIG. 4 to make a ring 2a of L-section, with a radius 26 of curvature which is the same as the radius of curvature as the same radially outer and axially outside edge of the lip 9. In addition the edge of the seal 2a is cut away at an angle 27. This leaves a space, in uncompressed condition of the ring 2a, between the end surface 20 and the inside so that as the lip 9 is pushed radially outward with its inside surface 21 moving through an angle 28 it rolls onto rather than cuts into the inside surface of the ring 2a. The angles 27 and 28 are normally approximately equal.

As seen in FIG. 5 the extension 11 is subdivided by the groove 14 into the scraper lip 15 having a scraper edge 33 that extends inward of the surface 7 and that scrapes the rod 23 in line contact, and the hook or retainer lip 16 which engages radially over the end surface 31 of the outer element 4. These two lips 16 and 15 are therefore connected via respective hinges 29 and 32 to the extension 11. The extension 11 has an outer surface 30 that bears on the stepped-in inner surface 3b of the element 4 so that the rod 23 is also guided at this extension 11.

Figure 6:
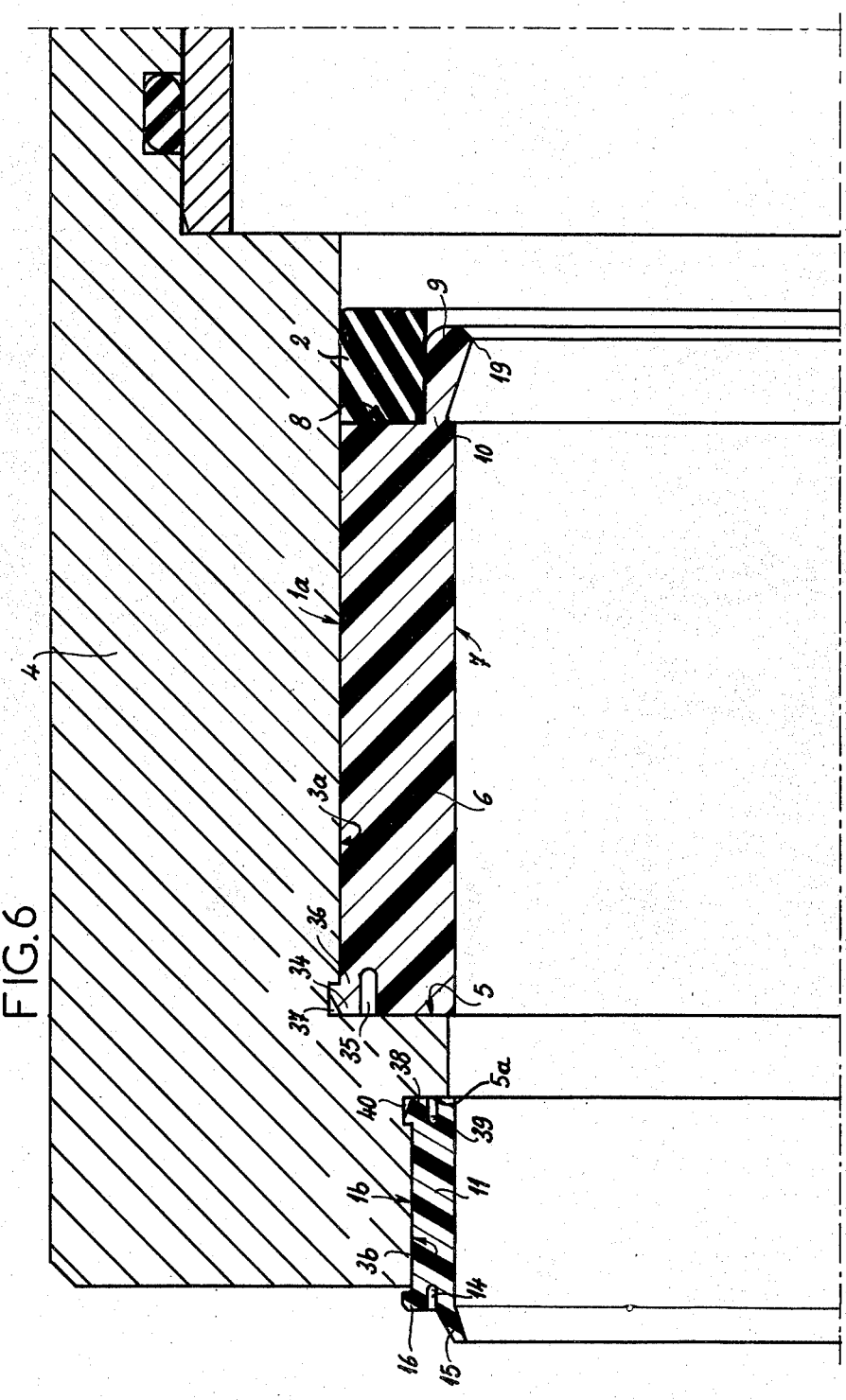
FIG. 6 is a view similar to FIG. 1 but showing another arrangement according to the present invention.

FIG. 6 shows an arrangement wherein the body 6 is subdivided into two parts 1a and 1b respectively on the high-pressure and low-pressure sides of the bore 3. The part 1a is formed at its end against the shoulder 5 with an annular axially outwardly open groove 35 defining a holding lip 36 having a beveled barb end 34 that engages in an inwardly open circumferential groove formed in the surface 3a at the shoulder 5. Thus this part 1a can simply be pushed into the bore 3 from the inside and will snap-lock in place.

Similarly the part 1b has an axially inner end formed with a groove 39 like the groove 35 that defines a catch lip 38 received in a groove 40 formed at a shoulder 5a at the end of the reduced-diameter portion 3b of the bore 3. This part 1b is therefore snap-locked in place simply by being pushed into the outside end of the passage 3 until its formation 38 locks in place in the groove 40.

The system according to the instant invention therefore combines in a single unit the functions of guiding the piston rod, scraping the piston rod, and sealing between the piston rod and the part it is sliding in. This subassembly can be installed relatively easily simply by being pushed axially into the bore, and can be removed when worn simply by yanking it out, as once the piston rod is no longer in place it is possible to deform the holding formations inward to free the unit. Servicing is therefore extremely easy. At the same time any possibility of installing a seal ring in the wrong groove, or misaligning the guide ring is impossible, as the subassembly of the body 6 and ring 2 is going to be correctly set up at manufacture, not by the mechanic installing it. One need merely know inside and outside diameters and length, and then the appropriate scraper/seal/guide unit can be installed.

I claim:

1. A seal, scraper, and guide assembly comprising:
   an outer normally fixed element having a cylindrical throughgoing passage centered on an axis, extending between an axially inside high-pressure side and an axially outside low-pressure side, and having a cylindrical inner element surface formed with a shoulder facing said inside high-pressure side;

a cylindrical normally axially slidable element extending axially between said sides through said passage and having an outer element surface spaced radially inwardly of said inner element surface;

a tubular body centered in said passage on said axis and having an outer body surface engaging radially outward against said inner element surface, a cylindrical inner body surface engaging radially inwardly against said outer element surface, whereby said slidable element is guided in said body, an end face engaging axially away from said high-pressure side against said shoulder, an axially inside end lip exposed at said inside high-pressure side, having a web connecting it to said body and an end lying in the absence of said slidable element radially inward of said cylindrical inner surface, and normally bearing radially inward on said slidable element, means including axially interengaging locking formations on said fixed element and on said body for blocking said body in said fixed element against axially inward displacement, and an axially outside end scraper lip exposed at said outside low-pressure side, lying in the absence of said slidable element radially inward of said cylindrical inner surface, and normally bearing radially inward on said slidable element; and an elastomeric ring at said inner high-pressure side and engaged between said inner lip and said wall and normally elastomerically urging said inside lip inward against said slidable element.

2. The assembly defined in claim 1 wherein said end lip is radially thinner at said web than at said end.

3. The assembly defined in claim 2 wherein said end lip engages said piston generally along a line in line contact and said end lip is thickest at said line.

4. The assembly defined in claim 2 wherein said end lip has a radially inwardly concave inner lip surface between said line and said web.

5. The assembly defined in claim 3 wherein said end lip has a radially outwardly convex outer lip surface engaging said ring.

6. The assembly defined in claim 5 wherein said ring has an inner ring surface complementary to said outer lip surface 7. The assembly defined in claim 6 wherein said inner ring surface has an axially inside portion spaced from said outer lip surface in the absence of said slidable element.

8. The assembly defined in claim 1 wherein said body has an extension extending toward said low-pressure side from said end face and of smaller radial thickness than said body between said end face and said end lip, said extension being formed with an axially outwardly open groove splitting it into said scraper lip and into another lip constituting one of said formations.

9. The assembly defined in claim 1 wherein said body is formed as an inside part forming portions of said inner and outer body surfaces, having said end face, and carrying said end lip and an outside part spaced axially in said passage from said inside part, forming portions of said inner and outer body surface, having said scraper lip, and formed with one of said formations, said inside and outside parts further comprising respective means for blocking them against displacement toward said high-pressure and low-pressure sides.

10. The assembly defined in claim 9 wherein said means for blocking said inside and outside parts against displacement toward said high-pressure and low-pressure sides includes respective radially outwardly extending formations closely axially juxtaposed with each other, said fixed element being formed with radially inwardly open grooves receiving said outwardly extending formations and also closely axially juxtaposed with each other.

* * * * *